Nov. 23, 1943.  C. W. CLAPP ET AL  2,334,752
COFFEE PERCOLATOR
Filed Dec. 26, 1940
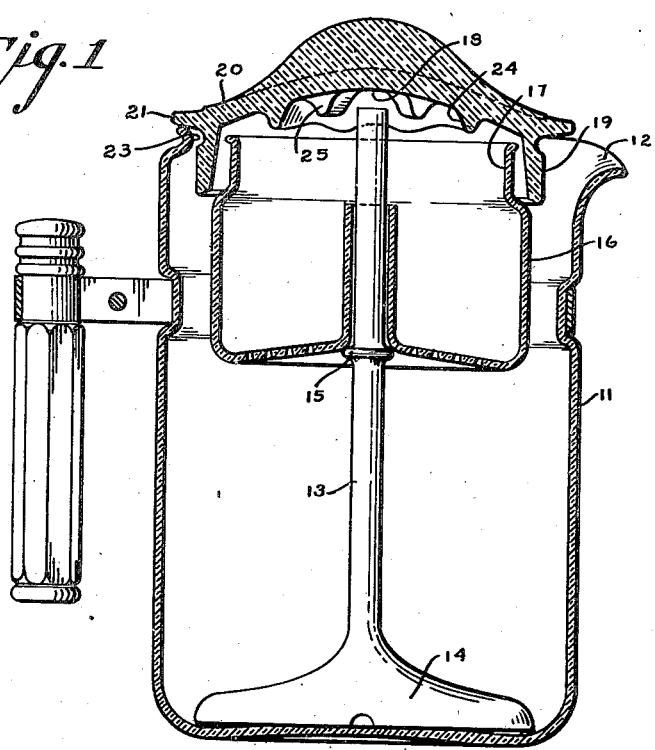
Fig. 1
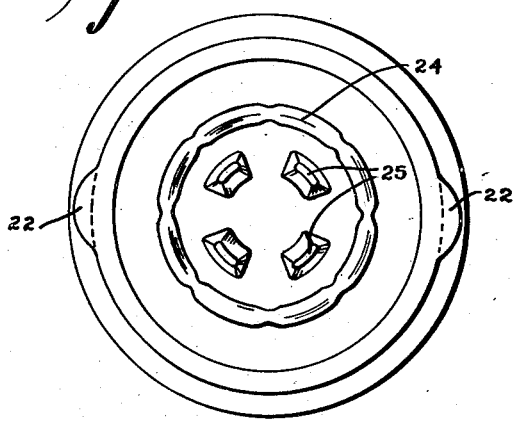
Fig. 2
Fig. 3
Fig. 4
Inventors
CHARLES W. CLAPP
AND PERCY L. ORR
By F. H. Knight
Attorney Patented Nov. 23, 1943

2,334,752

UNITED STATES PATENT OFFICE 2,334,752

COFFEE PERCOLATOR

Charles W. Clapp and Percy L. Orr, Corning, N. Y., assignors to Corning Glass Works, Corning, N. Y., a corporation of New York Application December 26, 1940, Serial No. 371,810

4 Claims. (Cl. 99—312)

The present invention relates to coffee maker assemblies and more particularly to a coffee maker assembly of the type commonly known as a percolator and usually comprising a covered liquid container with a pump having a delivery opening near the top of the container surrounded by a perforated basket for ground coffee.

In coffee makers of the foregoing type the liquid is pumped from the bottom of the container and is directed by the pump toward the center of the container cover. At low pumping rates the liquid may merely spill over the delivery opening of the pump into the surrounding coffee basket, but at higher pumping rates issues from the pump with material force, impinges against the container cover and rebounds and/or by gravitational action drains off the cover into the coffee basket.

During the initial portion of a percolating cycle the ground coffee froths and/or expands a very substantial amount, for a time slows up the rate of drainage through the basket and subsequently settles to near its initial level when dry. During this frothing period and at other times when the brew is being heated at a particularly rapid rate, a pump designed to deliver a sufficient quantity of liquid into the basket for efficient percolation of the brew under adverse conditions tends to flood the basket under favorable conditions. When this occurs, coffee grounds are carried by the liquid over the sides of the basket into the brew. To prevent this occurring and also to prevent the grounds from spilling over the edge of the basket when pouring the brew, it has been the general practice to provide the coffee basket with a tight fitting perforated cover commonly known as a spreader plate. Such a plate, however, complicates the assembly, hinders the free expansion of the grounds and accordingly slows up the flow of liquid through the basket. This slowing up of the flow of the liquid, especially during the frothing period, sometimes results in the entire space between such plate and the container cover becoming filled with liquid some of which is then lost out between the container opening and its cover and/or, under these circumstances abnormal pressure builds up below the coffee basket causing a part of the liquid to be forced out through the pouring spout.

One object of the present invention is a novel form of percolator cover.

A further object is a percolator cover which efficiently distributes liquid, impinged against it by a percolator pump, over an area occupied by a coffee basket during any of a rather wide range of pumping rates.

Another object of the invention is the combination in a percolator assembly of a novel form of cover which cooperates with the pump in such a manner that an efficient distribution of the pumped liquid over the ground coffee is effected over a wide range of pumping rates and which by-passes liquid around the basket containing the ground coffee when the pumping rate becomes excessive.

A further object of the invention is a percolator assembly in which the cover and basket cooperate with one another in a manner which prevents grounds in the basket from frothing over into the brew.

A still further object is a percolator assembly in which the cover cooperates with the basket to prevent coffee grounds from spilling over the basket into the brew during pouring.

Another object is a percolator basket of a capacity ample to hold the ground coffee in its fully expanded state and of such shape that it tends to prevent the grounds from spilling into the brew during a pouring operation.

Other and further objects and features of the invention will be apparent to those skilled in the art from a perusal of the following description and the accompanying drawing.

In the drawing

Fig. 1 is a sectional elevation of a percolator assembly embodying the invention;

Fig. 2 is a bottom plan of the assembly cover, and

Figs. 3 and 4 are developed circular line sections through portions of the cover provided with a drip ring and a series of drip lobes, the sections being through the center lines thereof.

The percolator ilustrated comprises a percolator body or brew container 11 open at the top and having a pouring spout or lip 12. Within the container is a pump having a tubular portion 13 with a bell shaped base 14 and a coffee basket supporting bead 15. A coffee basket 16 surrounds the tubular portion 13 of the pump and securely rests upon its bead 15. The coffee basket 16 has a constricted neck 17 and is of such capacity that the maximum required volume of ground coffee in a fully expanded and frothing state will never quite reach the top of the basket. The constricted portion of the basket, in addition to having features of utility which will be brought out later, provides ample space between it and the inner wall of the percolator body for the receipt of a depending flange portion 19 of a cover 20 which has a rim portion 21 adapted to rest on the top wall of the brew container 11. Ears 22 project laterally from the cover and cooperate in known manner with a constricted portion 23 of the container to hold the cover in place when the container is tilted to pouring position.

The under surface 18 of the cover has integral therewith a drip ring 24 of scallop or wavy configuration. Within the confines of this ring are a plurality of drip lobes 25 each arranged opposite a shallow portion of drip ring 24 and each of wedge-like configuration with its thinnest portion directed generally toward the axial center of the cover toward which the delivery end of the pump tube 13 opens. The projection, shape and relative arrangement of the drip ring 24 and of lobes 25 with respect to the surrounding under surface of the cover 20, and the spacing of the top of the basket 16 and of the top of pump tube 13 from the under surface of the cover, are all so calculated that through a wide range of pumping rates most of the fluid directed against the bottom surface of the cover accumulates on lobes 25 or passes over and between such lobes to depending scallops of the drip ring 24, from which it falls into the coffee basket. The design is such, on the other hand, that if the pumping rate is excessive a considerable amount of fluid will pass over the lobes 25 and over the scalloped portions of drip ring 24 and find its way down the inner wall surface of flange 19 into the container 11, thereby preventing the excessively pumped fluid from entering and flooding the coffee basket.

As previously mentioned, during the initial stages of the percolating period the ground coffee froths up an appreciable amount and during the subsequent percolating period settles back to near the height reached by it when placed in the basket dry. Also, as previously brought out, in conventional percolators a spreader plate is generally provided to restrict or prevent the overflow of the grounds into the brew but which hinders the free expansion of the grounds and during frothing reduces the drainage rate through the basket. In the instant structure the capacity of the coffee basket below the constriction therein is at least equivalent to the capacity of former baskets of percolators of a similar brew capacity and when frothing occurs the shoulder formed by the constricted portion of the basket prevents the frothing grounds from rising in the vicinity of the edges of the basket. Accordingly, in spite of the omission of a spreader plate, coffee grounds are not washed over the edges of the basket into the brew; and since free expansion of the grounds can occur over the greater portion of the basket area, filtering of the liquid is not retarded during the frothing period.

After the brewing has been completed, owing to the extra capacity of the basket, the level of the coffee grounds at this time are no higher than the lowermost level of the constricted portion of container 11. Accordingly, when the percolator is tilted to pour brew therefrom grounds will rarely roll or be washed forward in the basket far enough to reach or spill over the edge of the basket nearest the pouring spout. Even if they tend to do so, they are prevented from spilling into the brew because, as the assembly is tilted to pour the brew, the coffee basket tilts forward and the edge thereof nearest the pouring lip comes to rest against the adjoining inner edge of flange 19 to seal this portion of the basket against the pouring of solids therefrom.

While in the foregoing there has been shown and described the preferred embodiment of the invention, it is to be understood that minor changes in the details of construction and/or materials employed may be resorted to without departing from the spirit and scope of the invention as claimed.

What is claimed is:

1. In a coffee brewing apparatus, a container for brew having a top opening, a pump arranged within the container having a ground coffee basket associated therewith with the top of the basket in the vicinity of the top opening of the container, a cover for the container having a smooth inner surface against which fluid delivered by the pump is directed, and lobes arranged in spaced relation on the inner upper surface of said cover in a circular row, and a circular ridge of varying thickness depending from the inner upper surface of said cover and surrounding said lobes, said cover having a smooth inner surface between the portions thereof occupied by said lobes and ridge.

2. In a coffee brewing apparatus, a container for brew having a top opening, a pump arranged within the container having a ground coffee basket associated therewith with the top of the basket in the vicinity of the top opening of the container, a cover for the container having an inner surface against which fluid delivered by the pump is directed, lobes arranged in spaced relation on the inner upper surface of said cover, and a circular ridge of varying thickness on the inner upper surface of said cover surrounding said lobes and having a thinnermost portion thereof opposite each lobe.

3. In a coffee brewing apparatus, a container for brew having a top opening, a pump arranged within the container having a ground coffee basket associated therewith with the top of the basket in the vicinity of the top opening of the container, a cover for the container having an inner surface against which fluid delivered by the pump is directed, a circular ridge of varying thickness depending from the inner upper surface of said cover, and a row of lobes on the inner upper surface of said cover arranged in a circle concentric to that formed by said ridge.

4. In a percolator assembly a bottom having adjoining side wall portions projecting upward and forming an open topped brew container and having the upper edges of the side wall constricted except for a pouring lip portion thereof, a cover for said assembly having a laterally extending flange portion resting only on constricted edges of the container side wall, a pump within said container, a coffee basket having a constricted top opening supported by said pump at such height that its top is near the level of the top of said container, and a flange depending from said cover and occupying space between the container wall and the constricted portion of the coffee basket.

CHARLES W. CLAPP.
PERCY L. ORR.